(12) United States Patent
Kim et al.

(10) Patent No.: US 9,130,999 B2
(45) Date of Patent: Sep. 8, 2015

(54) METHOD FOR PROVIDING AUGMENTED REALITY, SERVER FOR SAME, AND PORTABLE TERMINAL

(75) Inventors: Namhoon Kim, Yongin-si (KR); Jungbin Im, Yongi-si (KR)

(73) Assignee: SK PLANET CO., LTD., Seoul (KR)

( * ) Notice: Subject to any disclaimer, the term of this patent is extended or adjusted under 35 U.S.C. 154(b) by 122 days.

(21) Appl. No.: 13/387,472

(22) PCT Filed: Jun. 29, 2010

(86) PCT No.: PCT/KR2010/004191
§ 371 (c)(1),
(2), (4) Date: Jan. 27, 2012

(87) PCT Pub. No.: WO2011/013910
PCT Pub. Date: Feb. 3, 2011

(65) Prior Publication Data
US 2012/0122491 A1 May 17, 2012

(30) Foreign Application Priority Data

Jul. 30, 2009 (KR) .................. 10-2009-0070254
Jul. 30, 2009 (KR) .................. 10-2009-0070258
Jul. 30, 2009 (KR) .................. 10-2009-0070269
Jul. 30, 2009 (KR) .................. 10-2009-0070271

(51) Int. Cl.
*H04L 29/08* (2006.01)
*H04L 29/06* (2006.01)

(52) U.S. Cl.
CPC .................. *H04L 67/22* (2013.01); *H04L 67/18* (2013.01); *H04L 67/38* (2013.01)

(58) Field of Classification Search
CPC ......... H04L 67/18; H04L 67/22; H04L 67/38; G01T 19/006

USPC ........................ 455/456.1–457; 345/629–633
See application file for complete search history.

(56) References Cited

U.S. PATENT DOCUMENTS

2008/0049696 A1* 2/2008 Stewart .................. 370/338
2009/0102859 A1* 4/2009 Athsani et al. ............ 345/619

(Continued)

FOREIGN PATENT DOCUMENTS

CN         101378525 A       3/2009
KR     10-2005-0055506       6/2005

(Continued)

OTHER PUBLICATIONS

International Search Report mailed Jan. 19, 2011 for PCT/KR2010/004191.

(Continued)

*Primary Examiner* — George Eng
*Assistant Examiner* — Marcus Hammonds
(74) *Attorney, Agent, or Firm* — Lowe Hauptman & Ham, LLP

(57) ABSTRACT

The present disclosure provides a method for providing an augmented reality, to server and portable terminal for same. Augmented reality providing server provides an augmented reality with information overlaid on captured video and includes server communication unit for inter-working with portable terminal; and server control unit for receiving selected menu information from portable terminal, generating first menu information data attained by extracting data that matches selected menu information by comparing the selected menu information with pre-stored location-associated information, and transmitting first menu information data to portable terminal, wherein the server control unit generates the first menu information data by selecting menus that match the selected menu information among a plurality of menus included in the location-associated information. In an embodiment, fast augmented reality operation can be obtained since portable terminal may receive and output information corresponding to menu selection immediately with a composition onto acquired image information.

12 Claims, 12 Drawing Sheets

(56) References Cited

U.S. PATENT DOCUMENTS

| | | | |
|---|---|---|---|
| 2009/0216446 A1* | 8/2009 | Ma et al. | 701/213 |
| 2009/0289955 A1* | 11/2009 | Douris et al. | 345/630 |
| 2010/0257252 A1* | 10/2010 | Dougherty et al. | 709/217 |

FOREIGN PATENT DOCUMENTS

| | | |
|---|---|---|
| KR | 10-2005-0078136 | 8/2005 |
| KR | 1020050078136 A | 8/2005 |
| KR | 10-2009-0062748 | 6/2009 |
| WO | 2009/029423 | 3/2009 |

OTHER PUBLICATIONS

Written opinion of ISA mailed Jan. 19, 2011 for PCT/KR2010/004191.

Chinese Office Action for dated May 29, 2014.

* cited by examiner

METHOD FOR PROVIDING AUGMENTED REALITY, SERVER FOR SAME, AND PORTABLE TERMINAL

CROSS REFERENCE TO RELATED APPLICATION

This application claims the priority of Korean Patent Application No. 10-2009-0070254, filed on Jul. 30, 2009 in the KIPO (Korean Intellectual Property Office); Korean Patent Application No. 10-2009-0070258, filed on Jul. 30, 2009 in the KIPO (Korean Intellectual Property Office); Korean Patent Application No. 10-2009-0070269, filed on Jul. 30, 2009 in the KIPO (Korean Intellectual Property Office); and Korean Patent Application No. 10-2009-0070271, filed on Jul. 30, 2009 in the KIPO (Korean Intellectual Property Office). Further, this application is the National Phase application of International Application No. PCT/KP2010/004191 filed Jun. 29, 2010, which designates the United States and was published in Korean.

TECHNICAL FIELD

Aspects of the present disclosure relate to a method for providing augmented reality, a server and a portable terminal for same. More particularly, the present disclosure relates to a method for providing augmented reality from user selection information, a server and a portable terminal therefor for receiving the user selected menu information from the terminal for example and selectively providing a particular corresponding menu to allow a selective display of only a choice of information by the user interested in supplement information on real objects within a real picture image.

BACKGROUND ART

Augmented reality (AR) technology is for sensing approximate position of a user and locating a service venue though comparisons between facility information such as nearby building data and real picture image data obtained from a camera in operation to provide related information. More specifically, being a branch of the virtual reality (VR), the augmented reality is a computer graphics technique that visually combines imaginary objects with the real world to provide the viewer with a scene of make-believe that objects appear to exist in the real world. Different from the conventional virtual reality involving only the virtual space and objects, it technically gets the real world reinforced with supplementary information through the synthesis of the virtual objects on the backdrop of the real world. Currently, the technology of augmented reality is in use in various fields such as broadcasting, advertisement, display, game, theme park, military, education, promotion, etc, yet it is not fully distributed to the general public.

The recent trend in the field of the mobile AR technology used in the communication terminal puts the spotlight to such augmented reality technology. Currently, applications based on the mobile AR technology starts to appear, and the early stage of technology is provided by using a marker based mobile AR technology or sensor based mobile AR technology. The marker based mobile AR technology incorporates particular symbols to be photographed and then recognized along with their corresponding building, while the sensor based mobile AR technology uses a GPS, digital compass and the like installed in the terminal to infer the current position of the terminal and its orientation of sight in which associated POI (point of interest) information is overlaid on the photographed image.

Such conventional technologies just presume the current position of the terminal and its orientation of sight by using the GPS, digital compass and the like installed in the terminal yet no technology has been provided for accurately recognizing the images inputted through the terminal.

DISCLOSURE

Technical Problem

In view of the foregoing, the present disclosure in an aspect proposes a method for providing augmented reality services, a server and a portable terminal therefor for accurately identifying real objects within an acquired image and mapping the geographical or local information of the corresponding object to provide image recognition based augmented reality which is intuitive and convenient.

Moreover, the present disclosure in an aspect proposes a method for providing augmented reality by using characteristic feature points, a server and a portable terminal therefor for accurately identifying a real object within an acquired image and mapping its local information to provide more accurate augmented reality.

The present disclosure in an aspect proposes a method for providing augmented reality, a server and a portable terminal therefor based on user selected information, which allows a selective display of only a choice of information by the user interested in supplement information on real objects within a real picture image.

In addition, the present disclosure in an aspect proposes a method for providing augmented reality, a server and a portable terminal therefor based on a user selected area, which is responsive to data provided on the user selected area apart from the user's current location for immediately providing the augmented reality in the event the terminal enters the same area.

Technical Solution

An aspect of the present disclosure provides an augmented reality providing server for providing augmented reality with information overlaid on a captured video, the server including: a server communication unit for inter-working with a portable terminal; and a server control unit for receiving a selected menu information from the portable terminal, generating a first menu information data attained by extracting data that matches the selected menu information by comparing the selected menu information with a location-associated information that has been previously stored, and transmitting the first menu information data to the portable terminal, wherein the server control unit generates the first menu information data by selecting menus that match the selected menu information among a plurality of menus included in the location-associated information.

Another aspect of the present disclosure provides a portable terminal provided with an augmented reality in real-time by inter-working with an augmented reality providing server, the terminal including: a display unit for displaying an application under execution; a terminal communication unit for inter-working with the augmented reality providing server; a camera module for acquiring an image information corresponding to a still image or a video; a key input unit for receiving an input of a user command; and a terminal control unit for transmitting a menu information selected by the user command to the augmented reality providing server, downloading a first menu information data corresponding to the menu information from the augmented reality providing server, and displaying the image information combined with the first menu information data through the display unit.

Yet another aspect of the present disclosure provides a method for providing augmented reality with information overlaid on a captured video, the method including: receiving a selected menu information from a portable terminal; generating a first menu information data attained by extracting data that matches the selected menu information by comparing the selected menu information with a location-associated information that has been previously stored; transmitting a real picture image information included in the location-associated information to the portable terminal; and transmitting the first menu information data with an incorporation of one or more kinds of information that matches the selected menu information among a latitude-longitude coordinate information corresponding to the real picture image information, point of interest (POI) information, advertisement information, name information, phone number information, promotion information, internet link information, and tagging information, to the portable terminal.

Yet another aspect of the present disclosure provides an augmented reality providing server for providing augmented reality with information overlaid on a captured video, the server including: a server communication unit for inter-working with a portable terminal; and a server control unit for receiving a selected local information from the portable terminal, generating a first local information data attained by extracting data that matches the selected local information by comparing the received selected local information with a location-associated information that have been previously stored, and transmitting the first local information data to the portable terminal, wherein the server control unit generates the first local information data containing all of a plurality of menus included in a specified locale after specifying the selected local information from a plurality of locales contained in the location-associated information.

Yet another aspect of the present disclosure provides a portable terminal for downloading augmented reality information by inter-working with an augmented reality providing server, the terminal including: a display unit for displaying an application under execution; a terminal communication unit for inter-working with the augmented reality providing server; a camera module for acquiring an image information corresponding to a still image or a video; a key input unit for receiving an input of a user command; and a terminal control unit for transmitting a local information selected by the user command to the augmented reality providing server, downloading a first local information data corresponding to the local information from the augmented reality providing server, and displaying the image information combined with the first local information data through the display unit.

Yet another aspect of the present disclosure provides a method for providing augmented reality information by an inter-working portable terminal, the method including: receiving a selected local information from the portable terminal; generating a first local information data attained by extracting data that matches a received selected local information by comparing the received selected local information with a location-associated information that have been previously stored; transmitting a real picture image information of a locale corresponding to the selected local information from the location-associated information to the portable terminal; and transmitting the first local information data with an incorporation of one or more kinds of information among a latitude-longitude coordinate information corresponding to the real picture image information of the locale corresponding to the selected local information, POI information, advertisement information, name information, phone number information, promotion information, internet link information, and tagging information, to the portable terminal.

Advantageous Effects

As illustrated in the above, according to an embodiment of the present disclosure, more intuitive and convenient image recognition based augmented reality can be provided by accurately identifying a real object within an acquired image and mapping its local information. Moreover, according to the embodiment of the present disclosure, a new advertising model can be presented because it can provide various kinds of information including advertisement information related to objects (buildings, structures, signs, patterns and logos, etc.) within the image obtained in the portable terminal, the promotion information, the tourism information and tagging information, etc.

According to another embodiment of the present disclosure, more accurate augmented reality can be provided by accurately identifying a real object within a real picture image and mapping its local information. Moreover, according to the embodiment of the present disclosure, a portion of the image obtained in the portable terminal may be transmitted to an augmented reality providing server, whereby providing the augmented reality without a lag occurred depending on the data size.

According to yet another embodiment of the present disclosure, a selective display may be made available of only a choice of information by the user interested in supplement information on real objects within a real picture image. In addition, according to the embodiment, a fast augmented reality operation can be obtained since the portable terminal may receive menu information data corresponding to user selection menu and immediately output the information corresponding to the selection menu with a composition onto the acquired image information.

In yet another embodiment of the present disclosure, data related to a user selected locale may be first provided apart from the user's current location, and the augmented reality is provided as soon as the terminal enters the same area. Moreover, according to the embodiment of the present disclosure, the augmented reality may be provided about the interest region which the user frequently visits by using local information data having been downloaded in advance and free of an information connection delay.

MODE FOR DISCLOSURE

Figure 1:
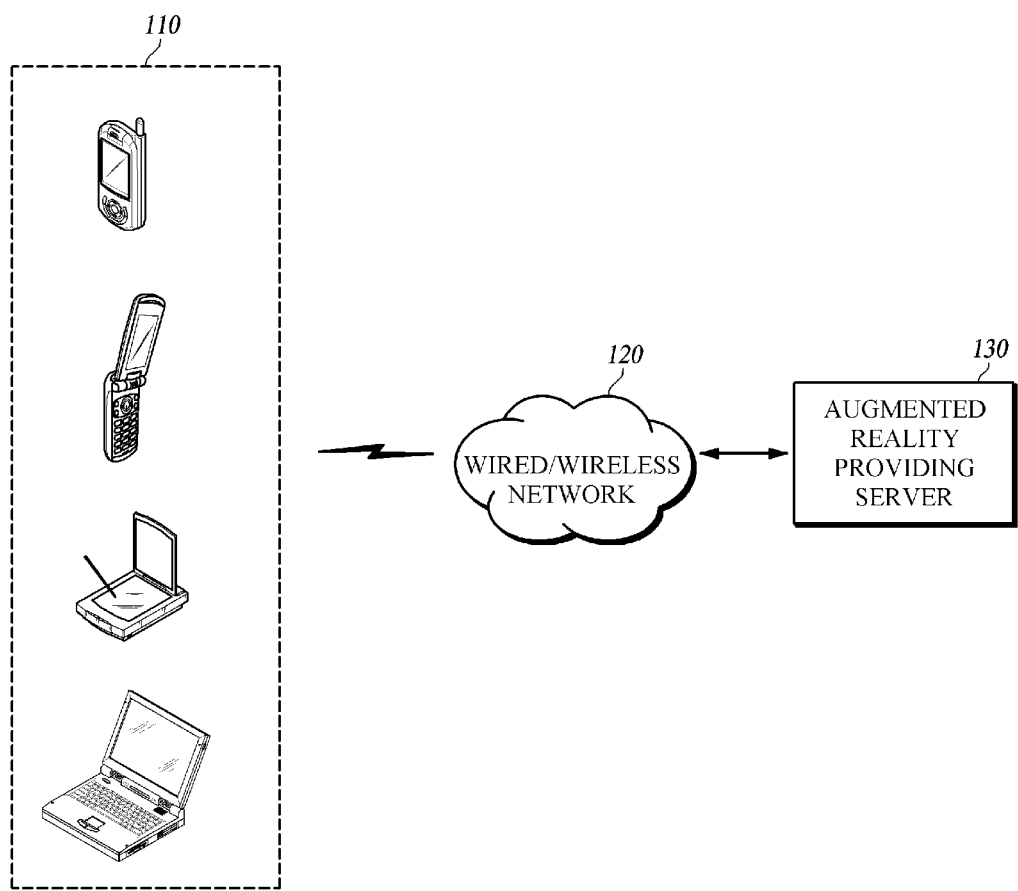
FIG. 1 is a schematic block diagram for showing a system for providing augmented reality according to an embodiment of the present disclosure.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a schematic block diagram for showing a system for providing augmented reality according to an embodiment of the present disclosure.

The augmented reality providing system according to the embodiment of the present disclosure includes a portable terminal 110, wired/wireless network 120, and an augmented reality providing server 130.

Portable terminal 110 means a typical voice call and data communication terminal for undertaking wireless telecommunication through inter-working with wired/wireless network 120. For example, portable terminal 110 may be a smartphone, PDA or personal digital assistant, cellular phone, PCS (personal communication service) phone, handheld PC, CDMA-2000 phone, WCDMA phone, PMP (portable multimedia player), PSP (PlayStation Portable), or MBS (mobile broadband system) phone, etc.

Portable terminal 110 according to the embodiment may be a terminal provided with a camera module which is used to obtain an image information corresponding to still images or video. Portable terminal 110 may also have a GPS module for providing a function of generating a position information based on navigation data included in radio wave signals. Although not necessary to implement the present disclosure, if the GPS module is provided to portable terminal 110, it may be used to calculate the current location information of portable terminal 110 where the current location information is used to shorten the search time of an AR DB, just in case augmented reality providing server 130 missed using location information.

Portable terminal 110 carries out functions of extracting a feature point from an acquired image information, transmitting the extracted feature point to augmented reality providing server 130, receiving local information data corresponding to the transmitted feature point from augmented reality providing server 130, and composing the received local information data with the acquired image information to output the combined information-data through a display unit. In addition, portable terminal 110 undertakes functions of transmitting the generated position information to augmented reality providing server 130, receiving current location information corresponding to the transmitted position information from augmented reality providing server 130, and composing the received local information data with the acquired image information based on the received current location information. Moreover, portable terminal 110 functions to extract the feature point based on one or more kinds of information selected from a color information, edge information, outline information, texture information, text information, and contour information depending on a specified angle with respect to a specific object, which are contained in the acquired image information. In addition, portable terminal 110 performs a function of composing the acquired image information with the local information data including one or more kinds of information selected from a name information, phone number information, point of interest (POI) information, advertisement information, promotion information, internet link information, and tagging information.

Portable terminal 110 transmits the image information acquired through the camera module to augmented reality providing server 130, receives local information data corresponding to the transmitted image information from augmented reality providing server 130, and combines the received local information data with the acquired image information to output the combined information-data through display unit 320. In addition, portable terminal 110 extracts selected one or more frames including initial frame 1 or frame 2, a key frame, and a video frame upon occurrence of a specific event deviating from a preset condition and then transmits the extracted frame or frames to augmented reality providing server 130.

Moreover, portable terminal 110 transmits a selected menu information by a user command inputted through a key input unit to augmented reality providing server 130, downloads a first menu information data corresponding to the selected menu information from augmented reality providing server 130, and outputs the acquired image information combined with the downloaded first menu information data through the display unit. In addition, portable terminal 110 combines the acquired image information with one or more kinds of information matching the received selected menu information among a latitude-longitude coordinate information corresponding to a real picture image information contained in the downloaded first menu information data, point of interest (POI) information, advertisement information, name information, phone number information, promotion information, internet link information, and tagging information.

Portable terminal 110 extracts a feature point from the acquired image information through the camera module, generates a second menu information data attained from extracting a data matched with an extracted feature point by comparing the extracted feature point to the downloaded first menu information data, and combines the generated second menu information data with the acquired image information. Further, portable terminal 110 transmits the position information generated by a GPS module to the augmented reality providing server, downloading a third menu information data corresponding to the selected menu information and the transmitted position information from augmented reality providing server 130, and combines the downloaded third menu information data with the acquired image information.

Portable terminal 110 transmits a selected local information by an inputted user command to augmented reality providing server 130, downloads a first local information data corresponding to the selected local information from the augmented reality providing server, and displaying the image information combined with the downloaded first local information data through the display unit. In addition, portable terminal 110 combines the acquired image information with one or more kinds of information from the latitude-longitude coordinate information corresponding to a real picture image information of the locale corresponding to the selected local information contained in the downloaded second local information data, point of interest (POI) information, advertisement information, name information, phone number information, promotion information, internet link information, and tagging information.

Additionally, portable terminal 110 transmits a generated position information to augmented reality providing server 130, receives a current location information corresponding to the transmitted position information from augmented reality providing server 130, and combines a received second local information data with the acquired image information based on the received current location information. Further, portable terminal 110 extracts a feature point from the acquired image information, generates a second local information data attained from extracting a data matched with the extracted feature point by comparing the extracted feature point to the downloaded first menu information data, and combines the generated second local information data with the acquired image information.

Wired/wireless network 120 refers to a communication network for transceiving data on the Internet protocols using various wired and wireless communication technologies, and includes the Internet, Intranet, mobile communication networks, satellite communication networks, etc. Wired/wireless network 120 may be a closed network including LAN (local area network), WAN (wide area network) and the like, but it is preferably an open network like Internet. The Internet means the global open computer network structure for providing different services, which exist in the TCP/IP protocol and upper layers, including HTTP (Hypertext Transfer Protocol), Telnet, FTP (File Transfer Protocol), DNS (Domain Name System), SMTP (Simple Mail Transfer Protocol), SNMP (Simple Network Management Protocol), NFS (Network File Service), NIS (Network Information Service). Moreover, if portable terminal 110 is a mobile communication terminal, wired/wireless network 120 may include a mobile communication network. Here, the technology of wired/wireless network 120 is well known in the art and the detailed description of the same will be omitted.

Augmented reality providing server 130 according to an embodiment of the present disclosure inter-works with portable terminal 110, and compares a feature point received from portable terminal 110 to a pre-stored location-associated information for extracting a local information data matched with the received feature point, and further functions to transmit the extracted local information data to portable terminal 110. In addition, augmented reality providing server 130 transmits the local information data containing one or more kinds of information including the name information, phone number information, POI information, advertisement information, promotion information, internet link information, and tagging information to portable terminal 110. Augmented reality providing server 130 also stores the location-associated information including one or more kinds of information including a real picture image information from photographing a real scene, latitude-longitude coordinate information corresponding to the real picture image information, POI information, and advertisement information. In addition, augmented reality providing server 130 calculates the current location information of portable terminal 110 by using a position information received from portable terminal 110, and extracts the local information data based on the calculated current location information. Further, augmented reality providing server 130 extracts the local information data based on a location information of a base station which is synchronized with portable terminal 110.

In addition, augmented reality providing server 130 extracts a feature point from an image information received from portable terminal 110, extracts a local information data which matches the extracted feature point by comparing the extracted feature point to a pre-stored location-associated information, and further functions to transmit the local information data to portable terminal 110. In addition, augmented reality providing server 130 extracts the feature point based on one or more kinds of information selected from a color information, edge information, outline information, texture information, text information, and contour information depending on a specified angle with respect to a specific object, which are contained in the received image information.

Further, augmented reality providing server 130 receives a selected menu information from portable terminal 110, generating a first menu information data attained by extracting data that matches the received selected menu information by comparing the received selected menu information with a pre-stored location-associated information, and transmits the generated first menu information data to portable terminal 110. Here, augmented reality providing server 130 generates such a partial menu list from multiple menu options contained in the pre-stored location-associated information and matching the selected menu information exclusively as the first menu information data. In addition, augmented reality providing server 130 transmits a real picture image information included in the location-associated information to portable terminal 110. Augmented reality providing server 130 also transmits the first menu information attained from extracting one or more kinds of information matching the received selected menu information among a latitude-longitude coordinate information corresponding to the real picture image information, POI information, advertisement information, name information, phone number information, promotion information, internet link information, and tagging information, to portable terminal 110. In addition, augmented reality providing server 130 calculates the current location information of portable terminal 110 by using a position information received from portable terminal 110, generates a third menu information data by extracting data that matches the current location information and the selected menu information among the location-associated information that is related with the range within a preset radius from the current location information, and sends the third menu information data to the portable terminal 110. Augmented reality providing server 130 also calculates a current location information of portable terminal 110 based on a location information of a base station which is synchronized with portable terminal 110, generates a fourth menu information data by extracting data that matches the current location information and the selected menu information among the location-associated information that is related with the range within a preset radius from the current location information, and sends the fourth menu information data to the portable terminal 110.

Additionally, augmented reality providing server 130 according to the embodiment receives a selected local information from portable terminal 110, generates a first local information data attained from extracting the data matching the received selected local information by comparing the received selected local information with a pre-stored location-associated information, and transmits the generated first local information data to the portable terminal. Here, augmented reality providing server 130 generates the first local information data containing all of a plurality of menus included in a specified locale after specifying the selected local information from a plurality of locales contained in the location-associated information. Augmented reality providing server 130 also transmits a real picture image information of a locale corresponding to the selected local information from the location-associated information to portable terminal 110. In addition, augmented reality providing server 130 transmits the first local information data containing one or more kinds of information from a latitude-longitude coordinate information corresponding to the real picture image information of the locale corresponding to the selected local information, POI information, advertisement information, name information, phone number information, promotion information, internet link information, and tagging information, to portable terminal 110. In addition, augmented reality providing server 130 calculates a current location information of portable terminal 110 by using a position information received from portable terminal 110, and transmits the calculated current location information to portable terminal 110.

Figure 2:
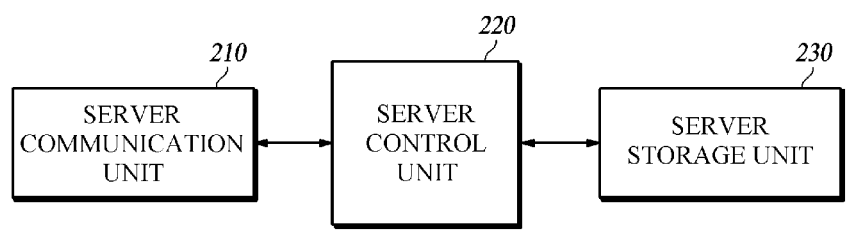
FIG. 2 is a schematic block diagram for showing an augmented reality providing server according to an embodiment of the present disclosure.

FIG. 2 is a schematic block diagram for showing an augmented reality providing server according to an embodiment of the present disclosure.

Augmented reality providing server 130 according to the embodiment comprises a server communication unit 210, a server control unit 220, and a server storage unit 230.

Although the embodiment of the present disclosure specifies the components of server communication unit 210, server control unit 220, and server storage unit 230 just to suggest an illustrative example of a technical idea of the disclosure, those skilled in the art will understand that the components of augmented reality providing server 130 may be variably altered and modified in applications without departing from the intrinsic characteristics of the present disclosure.

Server communication unit 210 is a means for inter-working with portable terminal 110 via wired/wireless network 120, and functions to transceive various data. Here, server communication unit 210 is described, but is not certainly limited to, as a module included within augmented reality providing server 130, and it may be a separate server for the purpose of communication of a mobile telecom company.

Referring to FIGS. 1 and 2 together, as a means for controlling the overall functions of the server, server control unit 220 according to this embodiment controls server communication unit 210 to compare a feature point received from portable terminal 110 to a pre-stored location-associated information for extracting a local information data matched with the received feature point, and further transmit the extracted local information data to portable terminal 110. By using server communication unit 210, server control unit 220 also transmits the local information data containing one or more kinds of information including a name information, phone number information, POI information, advertisement information, promotion information, internet link information, and tagging information to portable terminal 110. In addition, server control unit 220 calculates a current location information of the portable terminal by using a position information received from portable terminal 110, and extracts the local information data based on the calculated current location information. Further, server control unit 220 extracts the local information data based on a location information of a base station synchronized with portable terminal 110.

Such server control unit 220 may be comprised of a memory for storing a program for controlling the components of augmented reality providing server 130 and a microprocessor for executing the corresponding program to control each component of augmented reality providing server 130.

Server control unit 220 according to this embodiment the server control unit controls to extract a feature point from an image information received from portable terminal 110, extract a local information data matched with the extracted feature point by comparing the extracted feature point to a pre-stored location-associated information, and transmit the extracted local information data by using server communication unit 210 to portable terminal 110. In addition, server control unit 220 extracts the feature point based on one or more kinds of information selected from a color information, edge information, outline information, texture information, text information, and contour information depending on a specified angle with respect to a specific object, which are contained in the received image information.

Additionally, server control unit 220 controls server communication unit 210 to receive a selected menu information from portable terminal 110, generate a first menu information data attained by extracting data that matches the received selected menu information by comparing the received selected menu information with a pre-stored location-associated information, and transmit the generated first menu information data to portable terminal 110. Here, server control unit 220 generates the first menu information data by selecting menus that match the selected menu information among a plurality of menus included in the location-associated information. Server control unit 220 transmits a real picture image information included in the location-associated information to portable terminal 110. Server control unit 220 transmits the first menu information attained from extracting one or more kinds of information matching the received selected menu information among a latitude-longitude coordinate information corresponding to the real picture image information, POI information, advertisement information, name information, phone number information, promotion information, internet link information, and tagging information, to portable terminal 110.

Server control unit 220 calculates a current location information of portable terminal 110 by using a position information received from portable terminal 110, generates a third menu information data by extracting data that matches the current location information and the selected menu information among the location-associated information that is related with the range within a preset radius from the current location information, and sends the third menu information data to the portable terminal 110. Server control unit 220 also calculates a current location information of portable terminal 110 based on a location information of a base station synchronized with portable terminal 110, generates a fourth menu information data by extracting data that match the current location information and the selected menu information among the location-associated information that is related with the range within a preset radius from the current location information, and sends the fourth menu information data to the portable terminal 110. Such server control unit 220 may be comprised of a memory for storing a program for controlling the components of augmented reality providing server 130 and a microprocessor for executing the corresponding program to control each component of augmented reality providing server 130.

Further, server control unit 220 controls server communication unit 210 to receive a selected local information from portable terminal 110, generate a first local information data attained by extracting data that matches the received selected local information by comparing the received selected local information with a pre-stored location-associated information, and transmits the generated first local information data to portable terminal 110. Here, server control unit 220 generates the first local information data containing all of a plurality of menus included in a specified locale after specifying the selected local information from a plurality of locales contained in the pre-stored location-associated information. Server control unit 220 also transmits a real picture image information of the locale corresponding to the selected local information from the location-associated information to portable terminal 110. In addition, server control unit 220 transmits the first menu information data containing one or more kinds of information from a latitude-longitude coordinate information corresponding to the real picture image information of the locale corresponding to the selected local information, POI information, advertisement information, name information, phone number information, promotion information, internet link information, and tagging information, to portable terminal 110.

Server storage unit 230 is a means for storing various data needed for operating the server and stores the location-associated information including one or more kinds of information including the real picture image information, latitude-longitude coordinate information corresponding to the real picture image information, POI information, and advertisement information.

Figure 3:
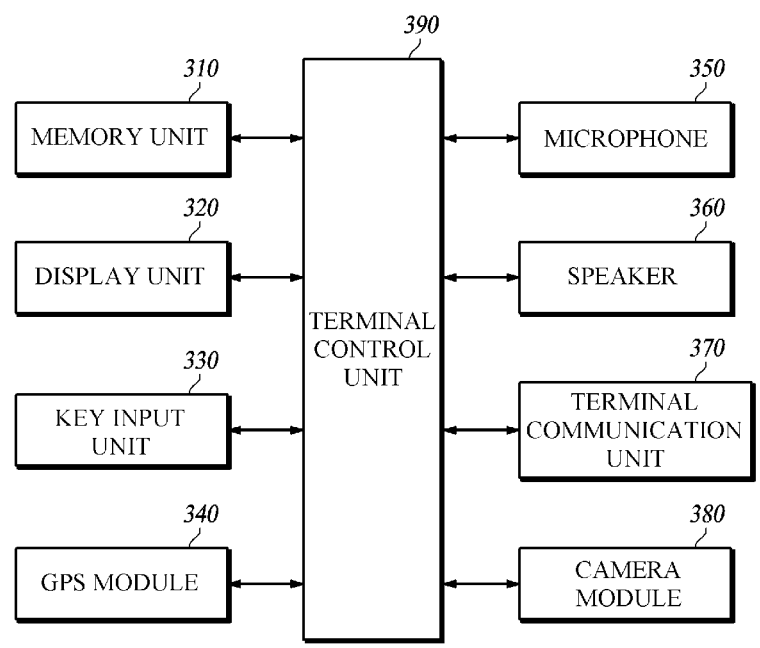
FIG. 3 is a schematic block diagram for showing a portable terminal according to an embodiment of the present disclosure.

FIG. 3 is a schematic block diagram for showing a portable terminal according to an embodiment of the present disclosure.

Portable terminal 110 according to the present embodiment of the present disclosure comprises a memory unit 310, a display unit 320, a key input unit 330, a GPS module 340, a microphone 350, a speaker 360, a terminal communication unit 370, a camera module 380, and a terminal control unit 390.

Although this embodiment of the present disclosure specifies its components by memory unit 310, display unit 320, key input unit 330, GPS module 340, microphone 350, speaker 360, terminal communication unit 370, camera module 380, and terminal control unit 390 just to suggest an illustrative example of a technical idea of the disclosure, those skilled in the art will understand that the components of portable terminal 110 may be variably altered and modified in applications without departing from the intrinsic characteristics of the present disclosure.

Memory unit 310 is a means for storing basic software for performing voice and data communications, multiple software programs for performing various supplementary functions including a camera function, and protocol software for processing messages exchanged in order to perform the wireless telecommunication. Display unit 320 indicates the operative state of portable terminal 110 including its current power usage, received signal strength of the electric wave, and time and date, and becomes a means for displaying screen with characters, numbers, and images if these forms of information are delivered. Key input unit 320 is equipped with buttons for inputting numbers, characters, and symbols to receive user key inputs or commands from the user of portable terminal 110. GPS module 340 generates the position information based on the navigation data included in the radio wave signals. Microphone 350 is a voice input means which converts and delivers the voice input of the subscriber to a mobile communication service into the electrical signal. Speaker 360 is an audio output means which converts and outputs the delivered voice signal into an audible sound.

Terminal communication unit 370 is a wireless communication processing means that processes wireless communications by providing functions including a digital signal processing function for coding/decoding voice signals, working as an equalizer for the multiple path noise cancellation, processing sound data, and the like; a baseband conversion function for converting transceived signals into baseband signals and undertaking the digital-analog conversion and analog-digital conversion, etc.; an RF signal processing function for receiving an RF (radio frequency) signal and converting it into an IF (intermediate frequency) signal, converting the IF signal to RF signal, demodulating and amplifying the RF signal; and an antenna function for transceiving the radio wave signals over the air. Terminal communication unit 370 also inter-works with augmented reality providing server 130. Camera module 380 acquires the image information corresponding to still images or videos.

Terminal control unit 390 according to the embodiment controls to extract a feature point from the acquired image information from camera module 380 and transmit the extracted feature point to augmented reality providing server 130, and controls to receive a local information data corresponding to the feature point transmitted from augmented reality providing server 130 and output the image information combined with the local information data through display unit 320. In addition, terminal control unit 390 controls to transmit the generated position information from GPS module 340 to augmented reality providing server, receive the current location information corresponding to the transmitted position information from augmented reality providing server 130, and compose the received local information data with the acquired image information based on the received current location information. Here, although the embodiment specifies that portable terminal 110 is equipped with GPS module 340, implementation is not necessarily limited in this way.

In addition, terminal control unit 390 extracts the feature point based on one or more kinds of information selected from a color information, edge information, outline information, texture information, text information, and contour information depending on a specified angle with respect to a specific object, which are contained in the acquired image information. Terminal control unit 390 also combines the acquired image information with the local information data containing one or more kinds of information including a name information, phone number information, POI information, advertisement information, promotion information, internet link information, and tagging information.

Terminal control unit 390 according to an embodiment controls the processes of transmitting the image information acquired through camera module 380 to augmented reality providing server 130 by using terminal communication unit 370, receiving a local information data corresponding to a image information transmitted from augmented reality providing server 130, and outputting the acquired image information combined with the received local information data through display unit 320. Terminal control unit 390 also extracts from the acquired image information, selected one or more frames including initial frame 1 or frame 2, a key frame, and a video frame upon occurrence of a specific event deviating from a preset condition from the acquired image information, and transmits an extracted frame or frames to augmented reality providing server 130. Terminal control unit 390 also transmits generated position information to augmented reality providing server 130, receives current location information corresponding to the transmitted position information from augmented reality providing server 130, and combines the received local information data with the acquired image information based on received current location information. In addition, terminal control unit 390 combines the acquired image information with the local information data containing one or more kinds of information including a name information, phone number information, POI information, advertisement information, promotion information, internet link information, and tagging information.

Terminal control unit 390 according to an embodiment utilizes camera module 380 to acquire image information corresponding to still images or a video, and utilizes GPS module 340 to generate position information based on navigation data included in the radio wave signals. Terminal control unit 390 also transmits selected menu information at a user command inputted through a key input unit to augmented reality providing server 130, downloads a first menu information data corresponding to the selected menu information from augmented reality providing server 130, and displays the acquired image information combined with the downloaded first menu information data through display unit 320. In addition, terminal control unit 390 combines the acquired image information with one or more kinds of information that matches the received selected menu information among a latitude-longitude coordinate information corresponding to a real picture image information contained in the downloaded first menu information data, point of interest (POI) information, advertisement information, name information, phone number information, promotion information, internet link information, and tagging information.

Terminal control unit 320 extracts a feature point from the acquired image information, generates a second menu information data attained from extracting a data matched with the extracted feature point by comparing the extracted feature point to the downloaded first menu information data, and combines the second menu information data with the acquired image information. Terminal control unit 320 also transmits the generated position information to augmented reality providing server 130, downloads a third menu information data corresponding to the selected menu information and the transmitted position information from augmented reality providing server 130, and combines the downloaded third menu information data with the acquired image information.

Terminal control unit 390 according to an embodiment transmits a selected local information by a user command inputted through key input unit 330 to the augmented reality providing server, downloads a first local information data corresponding to the selected local information from the augmented reality providing server, and displays the acquired image information combined with the first local information data through display unit 320. Terminal control unit 390 also combines the acquired image information with one or more kinds of information among a latitude-longitude coordinate information corresponding to a real picture image information of the locale corresponding to the selected local information contained in the downloaded second local information data, POI information, advertisement information, name information, phone number information, promotion information, internet link information, and tagging information. In addition, terminal control unit 390 sends the generated position information to augmented reality providing server 130, receives current location information corresponding to the generated position information sent from augmented reality providing server 130, and combines the received second local information data with the acquired image information based on the received current location information. Further, terminal control unit 390 extracts a feature point from the acquired image information, generates the second local information data attained by extracting a data that matches with an feature point extracted by comparing the extracted feature point to the downloaded first menu information data, and combines the generated second local information data with the acquired image information.

Figure 4:
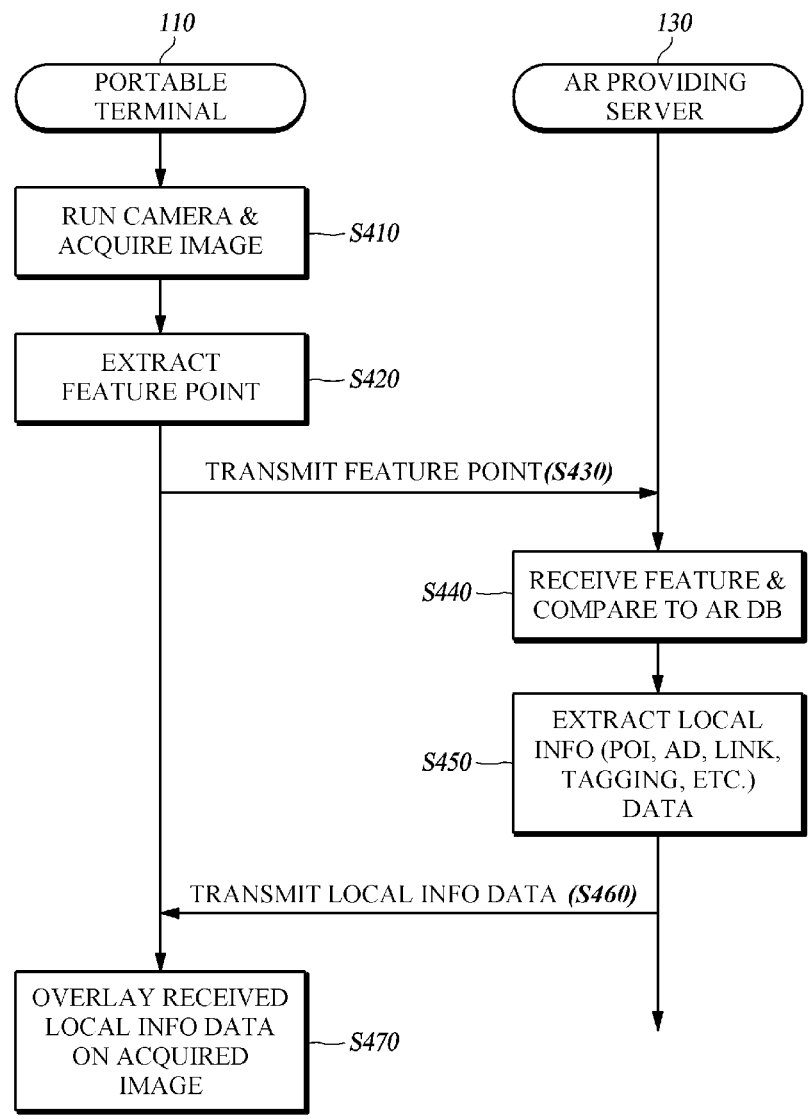
FIG. 4 is a flowchart for illustrating a method for providing augmented reality according to a first embodiment of the present disclosure.

FIG. 4 is a flowchart for illustrating a method for providing augmented reality according to a first embodiment of the present disclosure.

Referring to FIGS. 4 and 3 together, portable terminal 110 runs the mounted camera module 380 to acquire image information corresponding to still images or video at step S410. That is, portable terminal 110 is equipped with camera module 380 which is used to obtain image information corresponding to still images or video.

Portable terminal 110 extracts feature points of the image from the acquired image information (S420). Here, portable terminal 110 extracts the feature point based on one or more kinds of information selected from a color information, edge information, outline information, texture information, text information, and contour information depending on a specified angle with respect to a specific object, which are contained in the image information.

Portable terminal 110 transmits the extracted feature point to augmented reality providing server 130. Augmented reality server 130 compares the received feature point with a previously stored location-associated information (S440), follows the result of comparison to extract a local information data that matches with the received feature point (S450), and transmits the extracted local information data to portable terminal 110 (S460). Here, augmented reality providing server 130 stores the location-associated information including one or more kinds of information among real picture image information, latitude-longitude coordinate information corresponding to the real picture image, POI information, and advertisement information. Accordingly, augmented reality providing server 130 utilizes the pre-stored location-associated information to extract local information data containing one or more kinds of information including a name information, phone number information, POI information, advertisement information, promotion information, Internet link information, and tagging information, and sends the extracted local information data to portable terminal 110. In addition, augmented reality providing server 130 calculates current location information of portable terminal 110 by using position information received from the same portable terminal 110, and extracts the local information data based on the calculated current location information. Augmented reality providing server 130 may also extract the local information data based on location information of a base station synchronized with portable terminal 110.

Portable terminal 110 receives a local information data from augmented reality providing server 130, and outputs the acquired image information from camera module 380 combined with the received local information data through display unit 320 (S470). In other words, the acquired image information may be outputted through display unit 320, and the local information data from augmented reality providing server 130 may be presented overlaid on a particular object in the outputted image information. Further, portable terminal 110 may send the generated position information to augmented reality providing server 130, receive a current location information corresponding to the position information sent from augmented reality providing server 130, and combine the received local information data with the acquired image information based on the received current location information.

Although FIG. 4 specifies steps S410 to S470 are sequentially carried out by portable terminal 110 and augmented reality providing server 130, it is merely to illustrate an example of the technical idea of the present disclosure, and it will be understood by those skilled in the art that portable terminal 110 and augmented reality providing server 130 may undertake the steps in a changed order from the illustration, or carry out one or more steps S410 to S470 in parallel among other various alterations and modifications, and therefore the order of steps in FIG. 4 is not restricted in the time series.

The described service method of providing an augmented reality according to an embodiment of the present disclosure as illustrated in FIG. 4 may be recorded on a computer readable media. The computer readable media recorded with a computer program to implement the present method of providing an augmented reality according to the embodiment comprises any kinds of recording devices for recording data readable by computers. Examples of such computer readable recording media include ROM, RAM, CD-ROM, magnetic tapes, floppy discs, and optical data storages, and further comprise an implementation in carrier waves (e.g. transmission over the Internet). In addition, the computer readable recording media may be provided in a distributed processing system where computer systems are networked to store and execute computer readable codes at distributed locations. Furthermore, functional programs, codes, and code segments to implement the disclosed embodiment may be easily deduced by programmers of the technical field in which the embodiment of the present disclosure belongs.

Figure 5:
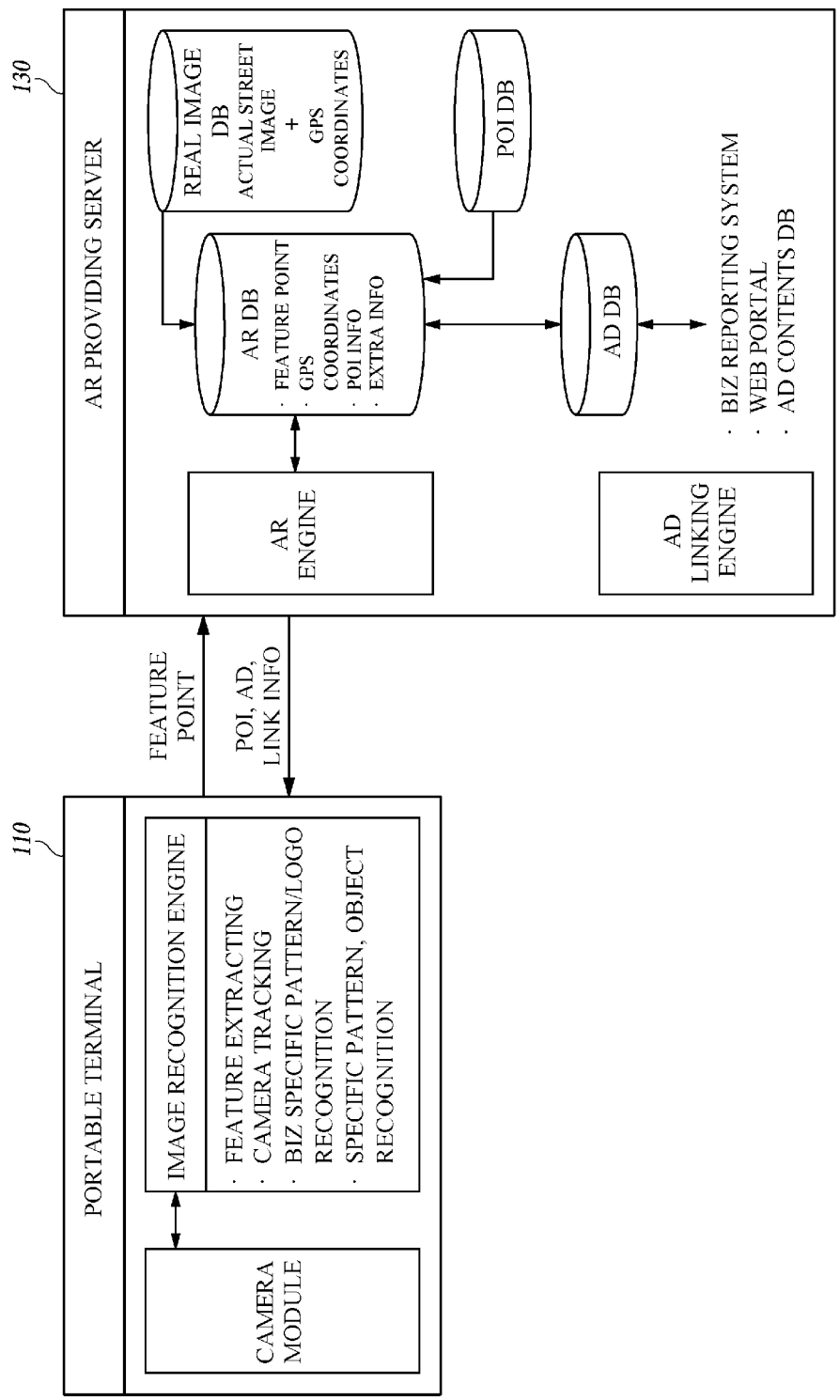
FIG. 5 is an example diagram for illustrating the functions of the portable terminal and the augmented reality providing server according to the first embodiment of the present disclosure.

FIG. 5 is an example diagram for illustrating the functions of the portable terminal and the augmented reality providing server according to the first embodiment of the present disclosure.

As illustrated in FIG. 5, augmented reality providing server 130 needs a dedicated DB establishment which refers to an AR DB formed by a combination of POI information and feature points extracted from photographed real images of actual geographical features (the topography, buildings, roads, and the like). The illustrated AR DB, real image DB, POI DB, and AD (advertisement) DB correspond to server storage unit 230 of augmented reality providing server 130. Here, the AR DB is for storing one or more of feature points, GPS coordinates, POI information, and additional information; the real image DB stores actual street images and the GPS coordinates that match the images; the POI DB store POI information; and AD DB is for inter-working with a business reporting system, Web portal, advertisement contents DB.

Referring to FIGS. 5 and 3 together, when a user takes a picture of real images using camera module 380 of portable terminal 110, the feature points is extracted from the frames within the still image or video by an analysis of terminal control unit 390, and the extracted feature point is delivered through wired/wireless network 120 to the AR DB of augmented reality providing server 130. The AR DB compares the received feature point with the pre-stored location-based information to search for an identical or matching feature point and deliver at least a kind of information among the corresponding POI, advertisement, promotion, internet link, and tagging information to portable terminal 110. At this time, information may be supplied from a base station where portable terminal 110 is in to shorten the search time of the AR DB of augmented reality providing server 130, just in case the location information is not used.

Figure 6:
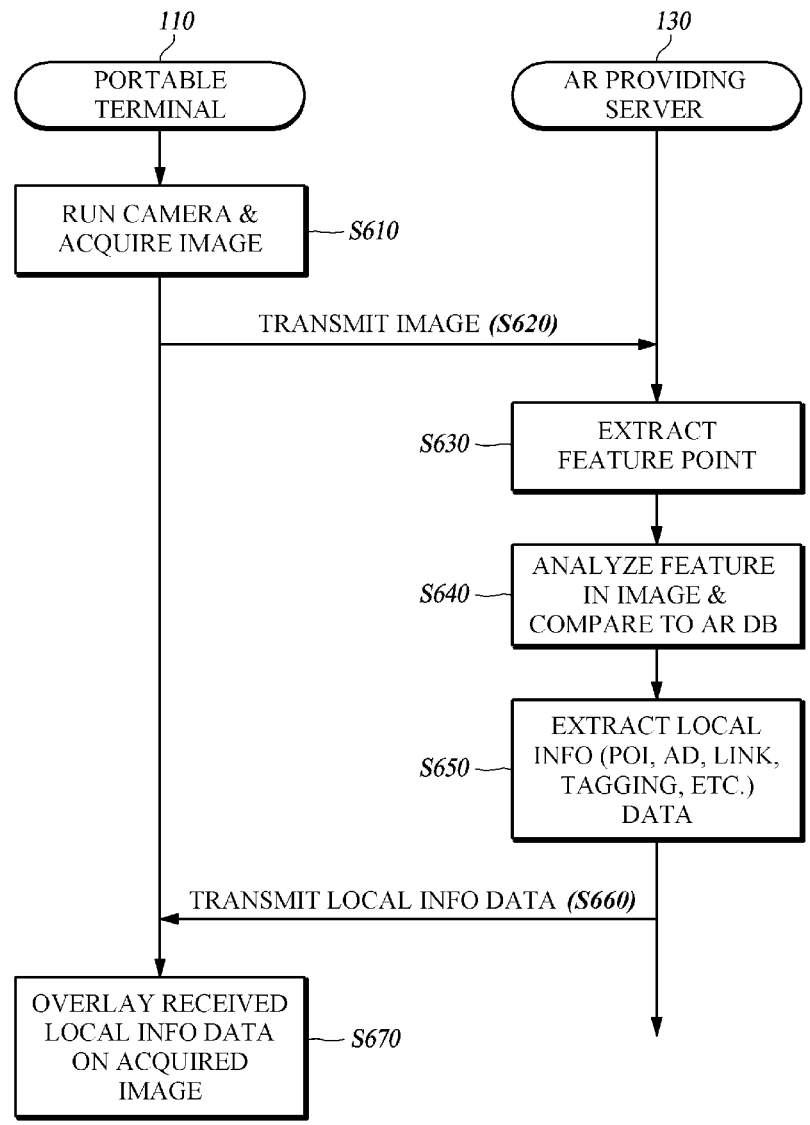
FIG. 6 is a flowchart for illustrating a method for providing augmented reality according to a second embodiment of the present disclosure.

FIG. 6 is a flowchart for illustrating a method for providing augmented reality according to a second embodiment of the present disclosure.

Referring to FIGS. 6 and 3 together, portable terminal 110 runs the mounted camera module 380 to acquire image information corresponding to still images or video at step S610. That is, portable terminal 110 is equipped with camera module 380 which is used to obtain image information corresponding to the still images or video.

Portable terminal 110 transmits the acquired image information to augmented reality providing server 130 at step S620. Here, since a delay may occur if portable terminal 110 transmits the entirety of the acquired image information, the image information for transmitting to augmented reality providing server 130 may be what is attained by extracting selected one or more frames including initial frame 1 or frame 2, a key frame, and a video frame upon occurrence of a specific event deviating from a preset condition.

Augmented reality providing server 130 extracts a feature point from image information received from portable terminal 110 (S630). Here, augmented reality providing server 130 extracts the feature point based on one or more kinds of information selected from a color information, edge information, outline information, texture information, text information, and contour information depending on a specified angle with respect to a specific object, which are contained in the image information.

Augmented reality server 130 compares the feature point received with a pre-stored location-associated information (S640), and in response to the result of comparison, extracts a local information data that matches with the received feature point (S650), and transmits the extracted local information data to portable terminal 110 (S660). Here, augmented reality providing server 130 stores the location-associated information including one or more kinds of information among a real picture image information, latitude-longitude coordinate information corresponding to the real picture image, POI information, and advertisement information. Accordingly, augmented reality providing server 130 utilizes the previously stored location-associated information to extract local information data containing one or more kinds of information including a name information, phone number information, POI information, advertisement information, promotion information, internet link information, and tagging information, and sends the extracted local information data to portable terminal 110. In addition, augmented reality providing server 130 calculates current location information of portable terminal 110 by using position information received from portable terminal 110, and extracts the local information data based on the calculated current location information. Augmented reality providing server 130 may also extract the local information data based on location information of a base station synchronized with portable terminal 110.

Portable terminal 110 receives a local information data from augmented reality providing server 130, and outputs the acquired image information from camera module 380 combined with the received local information data through display unit 320 (S670). Particularly, portable terminal 110 outputs on display unit 320 the combination of the acquired image information and the local information data containing one or more kinds of information including a name information, phone number information, POI information, advertisement information, promotion information, internet link information, and tagging information. Besides, portable terminal 110 may send the generated position information to augmented reality providing server 130, receive a current location information corresponding to the position information sent from augmented reality providing server 130, and combine the received local information data with the acquired image information based on the received current location information.

Although FIG. 6 specifies portable terminal 110 and augmented reality providing server 130 undertaking steps S610 to S670 sequentially, it is merely to illustrate an example of the technical idea of a second embodiment the present disclosure, and it will be understood by those skilled in the art that portable terminal 110 and augmented reality providing server 130 may undertake the steps in a changed order from the illustration of FIG. 6, or carry out one or more steps S610 to S670 in parallel among other various alterations and modifications, and therefore the order of steps in FIG. 6 is not restricted in the time series.

The described service method of providing an augmented reality according to the second embodiment of the present disclosure as illustrated in FIG. 6 may be recorded on a computer readable media. The computer readable media recorded with computer program to implement the present method of providing an augmented reality according to the second embodiment comprises any kinds of recording devices for recording data readable by computers. Examples of such computer readable recording media include ROM, RAM, CD-ROM, magnetic tapes, floppy discs, and optical data storages, and further comprise an implementation in carrier waves (e.g. transmission over the Internet). In addition, the computer readable recording media may be provided in a distributed processing system where computer systems are networked to store and execute computer readable codes at distributed locations. Furthermore, functional programs, codes, and code segments to implement the disclosed embodiment may be easily deduced by programmers of the technical field in which the second embodiment of the present disclosure belongs.

Figure 7:
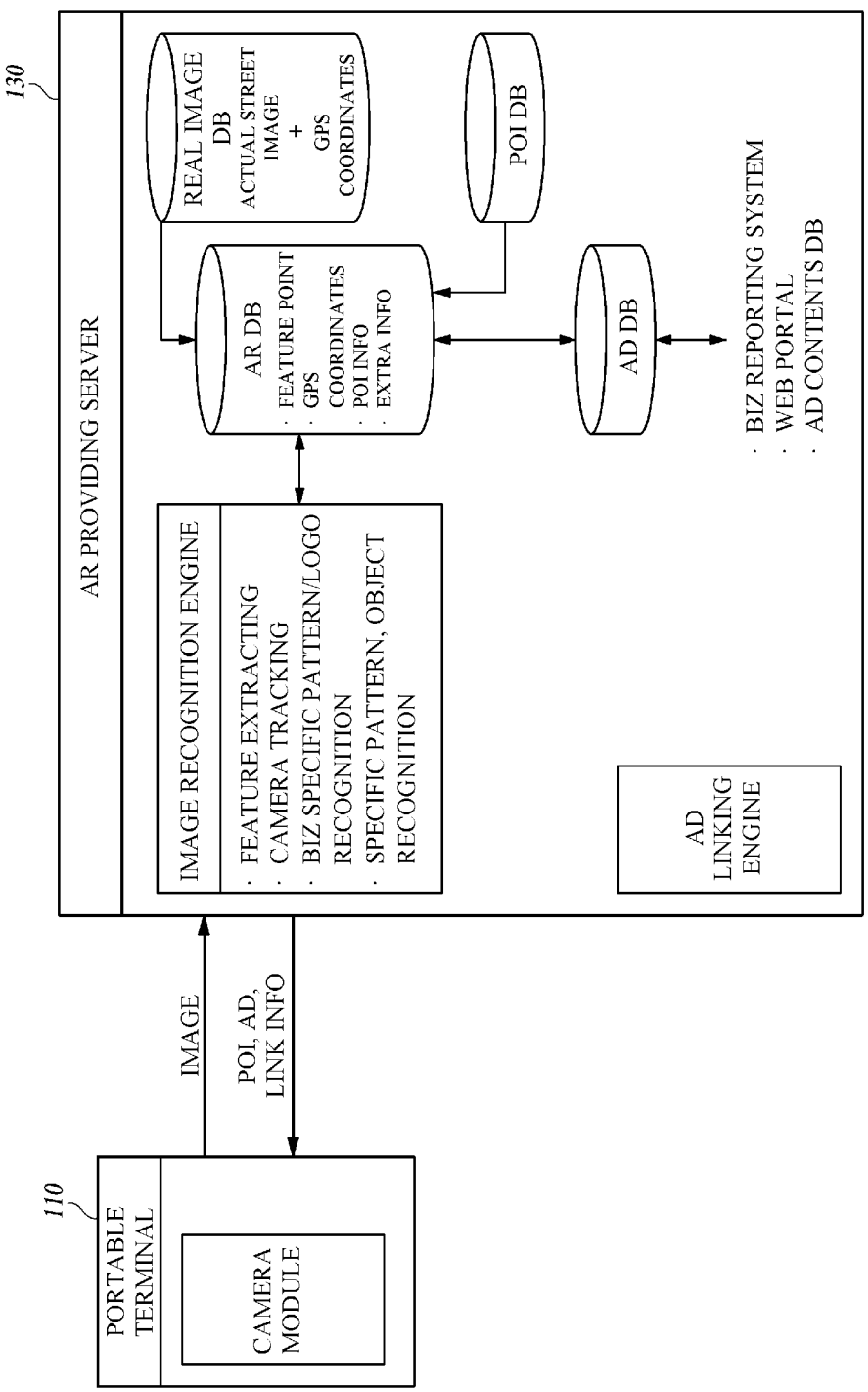
FIG. 7 is an example diagram for illustrating the functions of the portable terminal and the augmented reality providing server according to the second embodiment of the present disclosure.

FIG. 7 is an example diagram for illustrating the functions of the portable terminal and the augmented reality providing server according to the second embodiment of the present disclosure.

As illustrated in FIG. 7, augmented reality providing server 130 needs a dedicated DB establishment that means an AR DB formed by a combination of POI information and feature points extracted from photographed real images of actual geographical features (the topography, buildings, roads, and the like). The illustrated AR DB, real image DB, POI DB, and AD DB in FIG. 7 correspond to server storage unit 230 of augmented reality providing server 130. Here, the AR DB is for storing one or more of feature points, GPS coordinates, POI information, and additional information; the real image DB stores actual street images and the GPS coordinates that match the images; the POI DB store POI information; and AD DB is for inter-working with a business reporting system, web portal, advertisement contents DB.

Referring to FIGS. 7 and 3 together, portable terminal 110 transmits the acquired image information through camera module 380 to augmented reality providing server 130. Here, since a delay may occur if portable terminal 110 transmits the entirety of the acquired image information, portable terminal 110 only extracts what is attained by extracting selected one or more frames including initial frame 1 or frame 2, a key frame, and a video frame upon occurrence of a specific event deviating from a preset condition. In particular, the image information sent from portable terminal 110 is delivered via wired/wireless communication network (CDMA, GSM, GPRS, WCDMA, etc.) to the AR DB of augmented reality providing server 130.

Augmented reality providing server 130 utilizes the previously stored AR DB to analyze the frames within the real photo image of the image information received from portable terminal 110 to extract the feature points. Augmented reality providing server 130 compares the extracted feature point with the previously stored location-based information to search for an identical or matching feature point and deliver at least a kind of information among the corresponding POI, advertisement, promotion, internet link, and tagging information to portable terminal 110. At this time, information may be supplied from a base station where portable terminal 110 is in to shorten the search time of the AR DB of augmented reality providing server 130, just in case the location information is not used.

Figure 8:
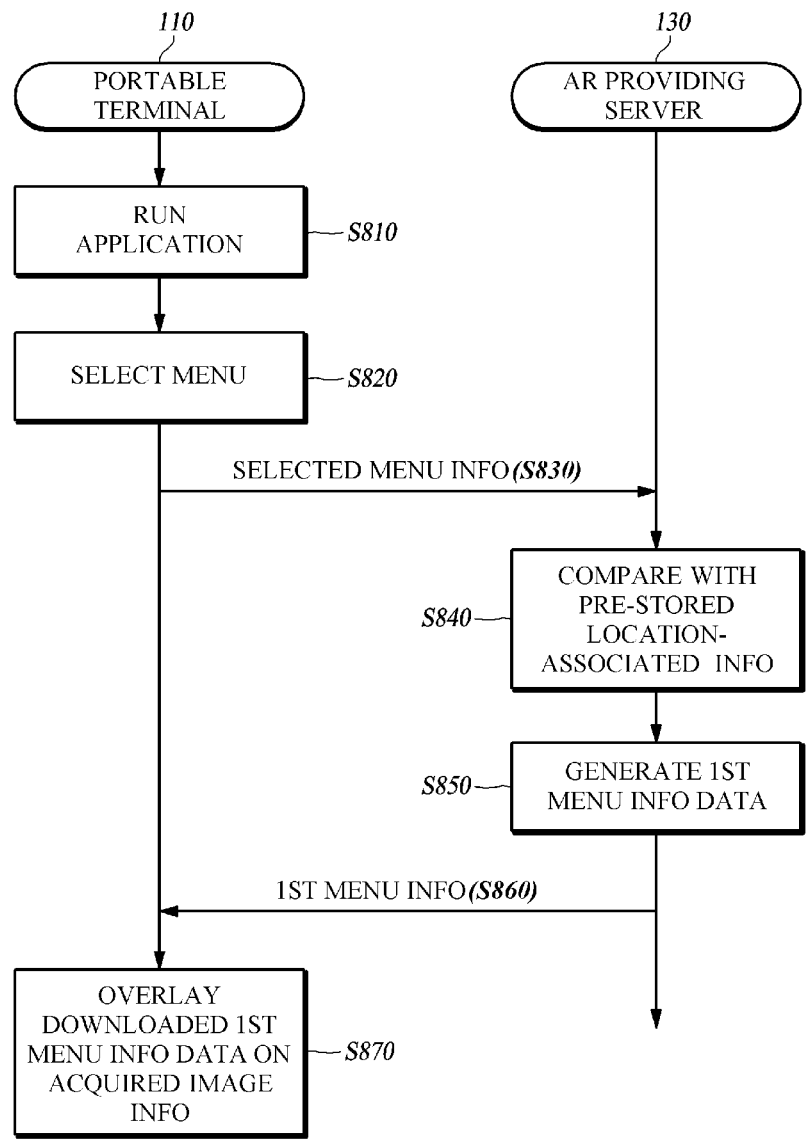
FIG. 8 is a flowchart for illustrating a method for providing augmented reality according to a third embodiment of the present disclosure.

FIG. 8 is a flowchart for illustrating a method for providing augmented reality according to a third embodiment of the present disclosure.

Portable terminal 110 operates an application for receiving the service of augmented reality offered at step S810, and if the user operates portable terminal 110 to make a specific menu selection in the running application, portable terminal 110 receives the selected menu information through key input unit 330 (S820). Portable terminal 110 transmits the selected menu information at the command of the user to augmented reality providing server 130 (S830).

Augmented reality providing server 130 receives selected menu information from portable terminal 110, compares the received selected menu information with the previously stored location-associated information (S840), generates a first menu information data attained by extracting data that matches the selected menu information (S850), transmits the generated first menu information data to portable terminal 110 (S860). Here, augmented reality providing server 130 sends real picture image information in the location-associated information to portable terminal 110. In addition, augmented reality providing server 130 sends the first menu information data attained by extracting data that matches one or more kinds of information from a latitude-longitude coordinate information corresponding to the real picture image information, POI information, advertisement information, name information, phone number information, promotion information, internet link information, and tagging information, to portable terminal 110. Augmented reality providing server 130 also calculates a current location information of portable terminal 110 by using a position information received from portable terminal 110, generates a third menu information data by extracting data that matches the calculated current location information and the selected menu information among the location-associated information that is related with the range within a preset radius from the current location information, and sends the third menu information data to portable terminal 110. In addition, augmented reality providing server 130 calculates a current location information of portable terminal 110 based on a location information of a base station synchronized with portable terminal 110, generates a fourth menu information data by extracting data that matches the calculated current location information and the selected menu information among the location-associated information that is related with the range within the preset radius from the current location information, and sends the fourth menu information data to portable terminal 110.

Portable terminal 110 downloads a first menu information data corresponding to the selected menu information from augmented reality providing server 130, and displaying the acquired image information combined with the downloaded first menu information data through display unit 320 (S870). In addition, portable terminal 110 may combine the acquired image information with one or more kinds of information matching the received selected menu information among a latitude-longitude coordinate information corresponding to a real picture image information contained in the downloaded first menu information data, POI information, advertisement information, name information, phone number information, promotion information, internet link information, and tagging information. Here, portable terminal 110 extracts a feature point from the image information acquired through camera module 380, generates a second menu information data attained by extracting a data that matches the extracted feature point by comparing the extracted feature point to the downloaded first menu information data, and combines the generated second menu information data with the acquired image information. Portable terminal 110 also extracts the feature point based on one or more kinds of information selected from a color information, edge information, outline information, texture information, text information, and contour information depending on a specified angle with respect to a specific object, which are contained in the image information acquired through camera module 380. Further, portable terminal 110 sends the position information generated through GPS module 340 to the augmented reality server, downloads a third menu information data corresponding to the selected menu information and the transmitted position information from augmented reality providing server 130, and combines the downloaded third menu information data with the acquired image information. Portable terminal 110 is a terminal provided with camera module 380 and GPS module 340 which are used to obtain an image information corresponding to still images or video and generate position information based on navigation data included in a radio wave signals, respectively.

Although FIG. 8 specifies portable terminal 110 and augmented reality providing server 130 undertaking steps S810 to S870 sequentially, it is merely to illustrate an example of the technical idea of a second embodiment the present disclosure, and it will be understood by those skilled in the art that portable terminal 110 and augmented reality providing server 130 may undertake the steps in a changed order from the illustration of FIG. 8, or carry out one or more steps S810 to S870 in parallel among other various alterations and modifications, and therefore the order of steps in FIG. 8 is not restricted in the time series.

The described service method of providing an augmented reality according to the third embodiment of the present disclosure as illustrated in FIG. 8 may be recorded on a computer readable media. The computer readable media recorded with computer program to implement the present method of providing an augmented reality according to the second embodiment comprises any kinds of recording devices for recording data readable by computers. Examples of such computer readable recording media include ROM, RAM, CD-ROM, magnetic tapes, floppy discs, and optical data storages, and further comprise an implementation in carrier waves (e.g. transmission over the Internet). In addition, the computer readable recording media may be provided in a distributed processing system where computer systems are networked to store and execute computer readable codes at distributed locations. Furthermore, functional programs, codes, and code segments to implement the disclosed embodiment may be easily deduced by programmers of the technical field in which the embodiment of the present disclosure belongs.

Figure 9:
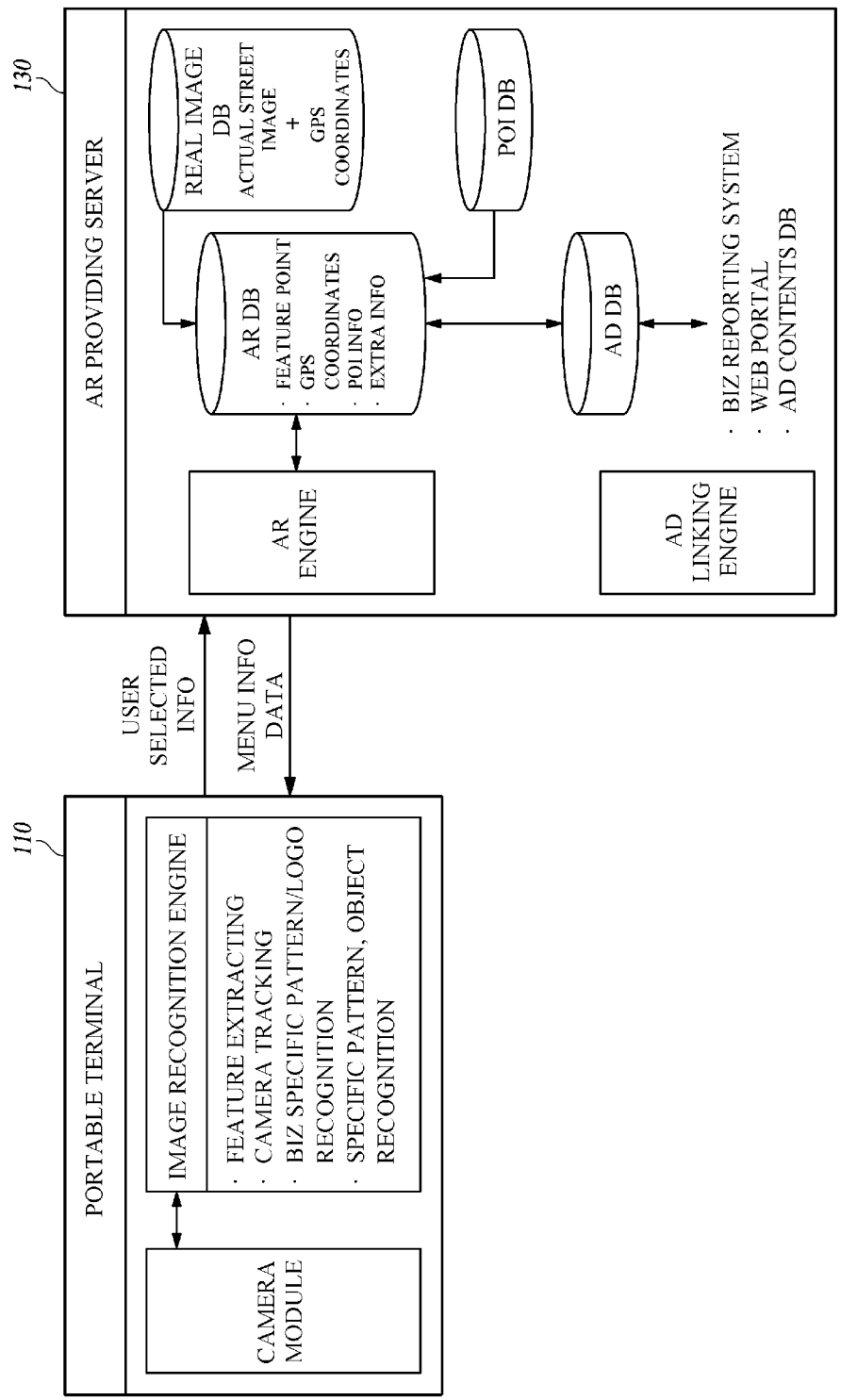
FIG. 9 is an example diagram for illustrating the functions of the portable terminal and the augmented reality providing server according to the third embodiment of the present disclosure, FIG. 10 a flowchart for illustrating a method for providing augmented reality according to a fourth embodiment of the present disclosure.

FIG. 9 is an example diagram for illustrating the functions of the portable terminal and the augmented reality providing server according to the third embodiment of the present disclosure.

As illustrated in FIG. 9, the user may operate portable terminal 110 and receive particularly desired choice of menus within the augmented reality. In particular, augmented reality providing server 130 sends menu information data according to the selected menu information received from portable terminal 110 back to portable terminal 110 which then downloads one or more kinds of information that matches the received selected menu information among real picture image information, its corresponding latitude-longitude coordinate information, POI information, advertisement information, name information, phone number information, promotion information, internet link information, and tagging information, and operates a mobile AR application. For example, if the user visited Myeong-dong intersection and selected 'famous restaurants' from a selection menu (where famous restaurant, theater, convenient store, map service and the like can be selected) within the augmented reality menus offered, the corresponding selection information is sent to augmented reality providing server 130 which sends the feature points, POI, promotion information and the like of 'family restaurant buildings' within a preset radius from the current location information of the user, to portable terminal 110. Upon having the corresponding information downloaded, portable terminal 110 displays only 'family restaurant info' combined with the image information acquired through camera module 380.

That is, when the user scans 'Myeong-dong shopping district' moving the installed camera module 380 from side to side, instead of having told to attend to transmissions of the varying images occurred to augmented reality providing server 130 and wait the respective responses from augmented reality providing server 130, the menu information data that matches the selected menu information is received in its entirety and downloaded in augmented reality providing server 130 allowing a rapid output of the downloaded menu information data combined with the image information acquired through camera module 380.

Figure 10:
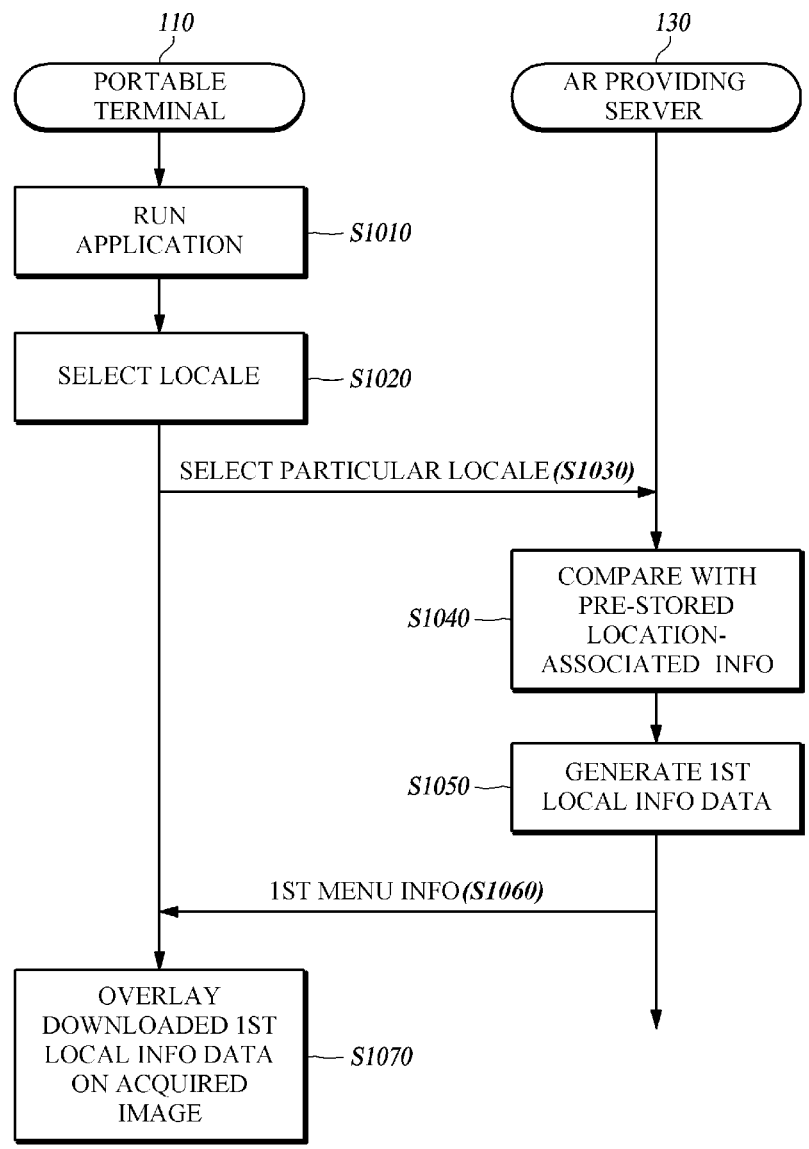

FIG. 10 a flowchart for illustrating a method for providing augmented reality according to a fourth embodiment of the present disclosure.

Portable terminal 110 operates an application for receiving the service of augmented reality offered at step S1010, and if the user operates portable terminal 110 to make a locale selection in the running application, portable terminal 110 receives selected local information through key input unit 330 (S1020). Portable terminal 110 transmits the selected local information at the command of the user to augmented reality providing server 130 (S1030).

Augmented reality providing server 130 receives selected local information from portable terminal 110, compares the received selected local information with the previously stored location-associated information (S1040), generates a first local information data attained by extracting data that matches the selected menu information (S1050), transmits the generated first local information data to portable terminal 110 (S1060). Here, augmented reality providing server 130 sends real picture image information corresponding to the selected local information among the location-associated information, to portable terminal 110. In addition, augmented reality providing server 130 sends the first local information data including one or more kinds of information from a latitude-longitude coordinate information corresponding to the real picture image information corresponding to the selected local information, POI information, advertisement information, name information, phone number information, promotion information, internet link information, and tagging information, to portable terminal 110. Augmented reality providing server 130 also calculates a current location information of portable terminal 110 by using a position information received from portable terminal 110, and sends the calculated current location information to portable terminal 110.

Portable terminal 110 downloads a first local information data corresponding to the selected menu information from augmented reality providing server 130, and displays the acquired image information combined with the downloaded first local information data through display unit 320 (S1070). In addition, portable terminal 110 combines the acquired image information with one or more kinds of information that matches the received selected menu information among a latitude-longitude coordinate information corresponding to a real picture image information of a locale corresponding to the selected local information included in the downloaded second local information data, POI information, advertisement information, name information, phone number information, promotion information, internet link information, and tagging information. In addition, portable terminal 110 sends the generated position information to augmented reality providing server 130, receives current location information corresponding to the position information sent from augmented reality providing server 130, and combines the received second local information data with the acquired image information based on the received current location information. Portable terminal 110 also extracts a feature point from the acquired image information, generates a second local information data attained by extracting a data that matches the extracted feature point by comparing the extracted feature point to the downloaded first local information data, and combines the generated second local information data with the acquired image information. In addition, portable terminal 110 extracts the feature point based on one or more kinds of information selected from a color information, edge information, outline information, texture information, text information, and contour information depending on a specified angle with respect to a specific object, which are contained in the acquired image information. Further, portable terminal 110 is a terminal provided with camera module 380 and GPS module 340 which are used to obtain an image information corresponding to still images or video and generate position information based on navigation data included in a radio wave signals, respectively.

Although FIG. 10 specifies portable terminal 110 and augmented reality providing server 130 undertaking steps S1010 to S1070 sequentially, it is merely to illustrate an example of the technical idea of a second embodiment the present disclosure, and it will be understood by those skilled in the art that portable terminal 110 and augmented reality providing server 130 may undertake the steps in a changed order from the illustration of FIG. 10, or carry out one or more steps S1010 to S1070 in parallel among other various alterations and modifications, and therefore the order of steps in FIG. 10 is not restricted in the time series.

The described service method of providing an augmented reality according to the fourth embodiment of the present disclosure as illustrated in FIG. 10 may be recorded on a computer readable media. The computer readable media recorded with computer program to implement the present method of providing an augmented reality according to the fourth embodiment comprises any kinds of recording devices for recording data readable by computers. Examples of such computer readable recording media include ROM, RAM, CD-ROM, magnetic tapes, floppy discs, and optical data storages, and further comprise an implementation in carrier waves (e.g. transmission over the Internet). In addition, the computer readable recording media may be provided in a distributed processing system where computer systems are networked to store and execute computer readable codes at distributed locations. Furthermore, functional programs, codes, and code segments to implement the disclosed embodiment may be easily deduced by programmers of the technical field in which the fourth embodiment of the present disclosure belongs.

Figure 11:
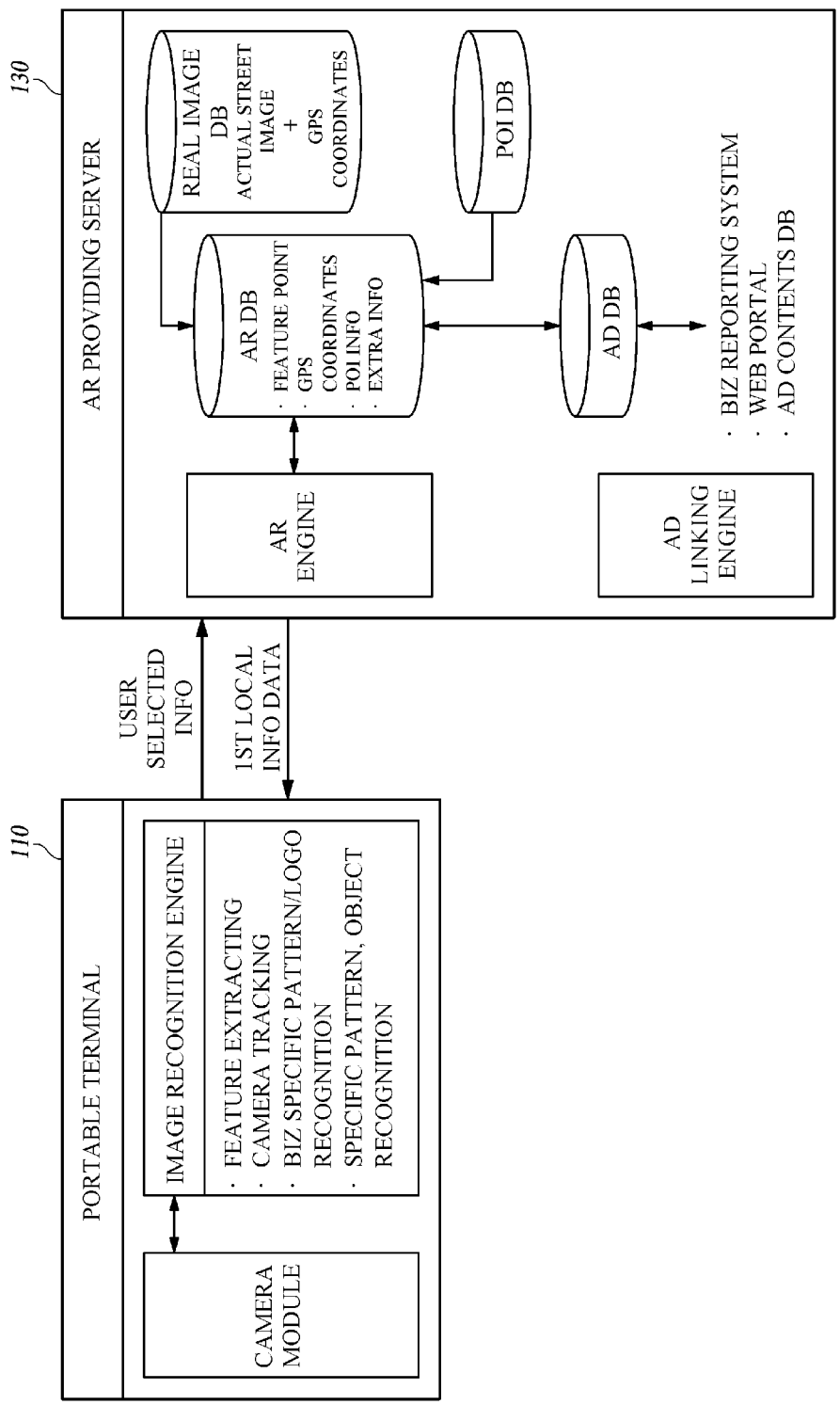
FIG. 11 is an example diagram for illustrating the functions of the portable terminal and the augmented reality providing server according to the fourth embodiment of the present disclosure.

FIG. 11 is an example diagram for illustrating the functions of the portable terminal and the augmented reality providing server according to the fourth embodiment of the present disclosure.

As illustrated in FIG. 11, the user may be offered selected district or area desirable from within the augmented reality by manipulating portable terminal 110. That is, being presented with download menus classified by districts, the user may receive a real-time augmented reality save any time delays in the corresponding district after having them downloaded in an independent application form (VM or separate software).

For example, the user may enter the mobile AR menus presenting 'Myeong-dong shopping district', 'Gangnam Station commercial entertainment district', 'Hongdae Area entertainment club district', 'Daehak-ro theater district', and selects 'Myeong-dong' which downloads one or more kinds of information among the real picture image of 'Myeong-dong', its corresponding latitude-longitude coordinate information, POI information, advertisement information, name information, phone number information, promotion information, internet link information, and tagging information, to user's portable terminal 110.

In particular, inside or outside of 'Myeong-dong', the user can download local information data about 'Myeong-dong' to portable terminal 110, and when the user enters the district operating the augmented reality application of portable terminal 110, it displays the combined image of the previously downloaded local information data and the image information obtained through camera module 380. This method of providing the augmented reality is capable of providing the user with the augmented reality without an information connection delay, which appears to the user as downloading maps by districts and permits usage of selective frequent interest districts through advance downloads.

Figure 12:
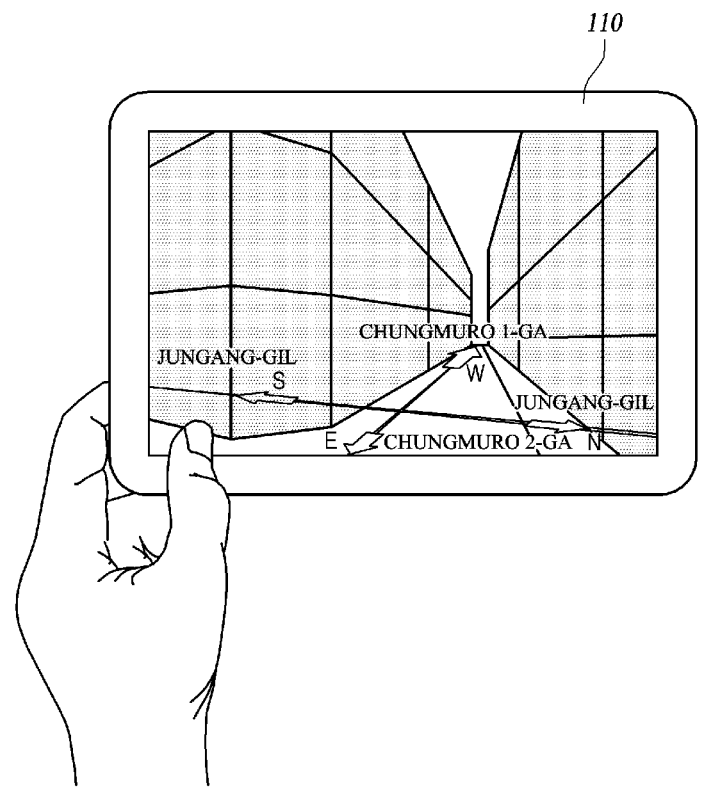
FIG. 12 is an example diagram for showing a portable terminal which displays augmented reality according to an embodiment of the present disclosure.

FIG. 12 is an example diagram for showing a portable terminal which displays augmented reality according to an embodiment of the present disclosure.

Referring to FIG. 12 along with FIGS. 2 and 3, portable terminal 110 is conveniently assumed to show the real photo image of 'Myeong-dong, Seoul' and the local information data composed onto the real photo image has been received from the data base established by server storage unit 230 of augmented reality providing server 130.

By the digital image processing technology of portable terminal 110, feature points may be extracted from a digital image so that the feature points may be expressed as a digital data set based on one or more kinds of information selected from a color information, edge information, outline information, texture information, text information, and contour information depending on a specified angle with respect to a specific object, which are contained in the digital image. Particularly, the acquired image information is mostly outdoor street pictures to which an embodiment of the present disclosure is expected to show frequent applications. In the case of outdoor street pictures, the higher proportion of linear features of buildings, roads, signs along with logos, characters, and particular patterns facilitates the extractions of feature points than overall non-rigid objects.

Although schematic In FIG. 12, as 'Myeong-dong, Seoul' holds countless signs all over, feature points may be extracted from the overall outlines of various sign images including 'coffee sign', 'plastic surgery sign', 'karaoke sign', 'fashion sign' and the like, building outlines, and the contents of the signs. In addition, photographing streets in 'Myeong-dong, Seoul' at various angles allows extracting feature points of the size of signs and letter information. Depending on the extraction algorithms and included information in the images, the volume of data for expressing the feature points may be reduced by less than one tenths to one hundredths. For example, if the source image is of 100 Kbyte, the extracted feature point data may be expressed by less than 1~10 Kbyte. At this time, it is possible to generate a new DB that combines the extracted feature points, POI information such as a telephone number of 'coffee sign' or current promotion (sale) information, customer comment recordings, particular internet links, and such DB may be utilized as server storage unit 230 of augmented reality providing server 130. Therefore, if the user uses camera module 380 of the portable terminal 110 to photograph buildings at 'Myeong-dong intersection', portable terminal 110 inter-works with augmented reality providing server 130 to receive information on store names, phone numbers, promotion information, tourism information and other tagging information and combine them with the acquired image information to display what is illustrated in FIG. 12.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such program may be easily deduced by a person skilled in the art. The computer program may be stored in computer readable media, which in operation can realize the aspects of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purpose, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in various fields where a selective display may be made available of only a choice of information by the user interested in supplement information on real objects within a real picture image, whereby a fast augmented reality operation can be obtained since the portable terminal may receive menu information data corresponding to user selection menu and immediately output the information corresponding to the selection menu with a composition onto the acquired image information.

CROSS-REFERENCE TO RELATED APPLICATION

If applicable, this application claims priorities under 35 U.S.C §119(a) of Patent Application No. 10-2009-0070254, Patent Application No. 10-2009-0070258, Patent Application No. 10-2009-0070269, and Patent Application No. 10-2009-0070271, commonly filed on Jul. 30, 2009 in Korea, the entire contents of which are incorporated herein by reference. In addition, this non-provisional application claims priorities in countries, other than the U.S., with the same reason based on the Korean Patent Applications, the entire contents of which are hereby incorporated by reference.

The invention claimed is:

1. An augmented reality providing server for providing an augmented reality with information overlaid on a captured video, the server comprising:
    a server communication unit for inter-working with a portable terminal;
    a server control unit for
        receiving selected menu information from the portable terminal,
        comparing the selected menu information with location-associated information that has been stored in the server control unit,
        extracting, from the location-associated information, data that matches the selected menu information based on a result of the comparing,
        generating a first menu based on the extracted data, and transmitting the generated first menu information to the portable terminal; and
    an augmented reality database (AR DB) for
        comparing a feature point received from the portable terminal with pre-stored location-based information in the AR DB, to search for a feature point identical to or matching with the received feature point,
        delivering at least one kind of information among a corresponding point-of-interest (POI), advertisement, promotion, internet link, and tagging information, to the portable terminal, the at least one kind of information associated with the feature point found to be identical to or matching with the received feature point, wherein the extracted data comprises a menu that matches the selected menu information among a plurality of menus included in the location-associated information,
wherein the server control unit
calculates first current location information of the portable terminal by using position information received from the portable terminal,
generates third menu information data by extracting data, which matches to the first current location information and the selected menu information, from the location-associated information that is related with a range within a preset radius from the first current location information, and
sends the third menu information data to the portable terminal, and
wherein the server control unit further
calculates second current location information of the portable terminal based on location information of a base station synchronized with the portable terminal,
generates fourth menu information data by extracting data, which matches to the second current location information and the selected menu information, among the location-associated information that is related with a range within the preset radius from the second current location information, and
sends the fourth menu information data to the portable terminal.

2. The augmented reality providing server of claim 1, wherein the server control unit transmits a real picture image information included in the location-associated information to the portable terminal.

3. The augmented reality providing server of claim 2, wherein the server control unit transmits the first menu attained by extracting one or more kinds of information that matches the selected menu information among a latitude-longitude coordinate information corresponding to the real picture image information, point of interest (POI) information, advertisement information, name information, phone number information, promotion information, Internet link information, and tagging information, to the portable terminal.

4. The augmented reality providing server of claim 1, wherein the server control unit compares the feature point received from the portable terminal with pre-stored location-associated information for extracting local information data matched with the received feature point, and further transmits the extracted local information data to the portable terminal.

5. The augmented reality providing server of claim 4, wherein the server control unit transmits the local information data containing one or more kinds of information including a name information, phone number information, POI information, advertisement information, promotion information, Internet link information, and tagging information, to the portable terminal.

6. The augmented reality providing server of claim 4, further comprising a server storage unit for storing the location-associated information including one or more kinds of information including real picture image information, latitude-longitude coordinate information corresponding to the real picture image information, POI information, and advertisement information.

7. The augmented reality providing server of claim 1, wherein
the server control unit extracts the feature point from image information received from the portable terminal, extracts local information data matched with the extracted feature point by comparing the extracted feature point to the location-associated information, and further transmits the extracted local information data to the portable terminal, and
the portable terminal transmits the image information to the server communication unit by sending only a part of the captured video as the image information.

8. The augmented reality providing server of claim 7, wherein the image information is information attained from extracting selected one or more frames including initial frame 1 or frame 2, a key fame, and a video frame upon occurrence of a specific event deviating from a preset condition.

9. The augmented reality providing server of claim 7, wherein the server control unit extracts the feature point based on one or more kinds of information selected from a color information, edge information, outline information, texture information, text information, and contour information depending on a specified angle with respect to a specific object, which are contained in the image information.

10. An augmented reality providing server for providing an augmented reality with information overlaid on a captured video, the server comprising:
a server communication unit for inter-working with a portable terminal;
a server control unit for
receiving selected local information from the portable terminal,
comparing the received selected local information with location-associated information that have been stored,
extracting, from the location-associated information, data that matches the selected local information based on the comparing,
generating a first local menu based on the extracted data, and
transmitting the first local menu information data to the portable terminal; and
an augmented reality database (AR DB) for
comparing a feature point received from the portable terminal with pre-stored location-based information in the AR DB, to search for a feature point identical to or matching with the received feature point,
delivering at least one kind of information among a corresponding point-of-interest (POI), advertisement, promotion, internet link, and tagging information, to the portable terminal, the at least one kind of information associated with the feature point found to be identical to or matching with the received feature point,
wherein the extracted data comprises a local menu containing all of a plurality of menus included in a specified locale after specifying the selected local information from a plurality of locales contained in the location-associated information,
wherein the server control unit
calculates first current location information of the portable terminal by using a position information received from the portable terminal,
generates third menu information data by extracting data, which matches to the first current location information and the selected menu information, from the location-associated information that is related with a range within a preset radius from the first current location information, and
sends the third menu information data to the portable terminal, and
wherein the server control unit further
calculates second current location information of the portable terminal based on location information of a base station synchronized with the portable terminal, generates fourth menu information data by extracting data, which matches to the second current location information and the selected menu information, among the location-associated information that is related with a range within the preset radius from the second current location information, and sends the fourth menu information data to the portable terminal.

11. The augmented reality providing server of claim 10, wherein the server control unit transmits a real picture image information of a locale corresponding to the selected local information from the location-associated information to the portable terminal.

12. The augmented reality providing server of claim 10, wherein the server control unit transmits the first local menu containing one or more kinds of information from a latitude-longitude coordinate information corresponding to the real picture image information of the locale corresponding to the selected local information, point of interest (POI) information, advertisement information, name information, phone number information, promotion information, internet link information, and tagging information, to the portable terminal.

\* \* \* \* \*